April 21, 1970 W. C. BUNINGH 3,507,613
METHOD OF REMOVING CARBONYL SULFIDE FROM GASES
Filed Aug. 16, 1966

INVENTOR:
WEIGERT C. BUNINGH
BY: *Marion W. Western*
HIS AGENT

3,507,613
METHOD OF REMOVING CARBONYL SULFIDE FROM GASES

Weigert C. Buningh, Amsterdam, Netherlands, assignor to Shell Oil Company, New York, N.Y., a corporation of Delaware
Filed Aug. 16, 1966, Ser. No. 572,774
Claims priority, application Netherlands, Aug. 17, 1965, 6510730; Dec. 9, 1965, 6515994
Int. Cl. B01d 53/14
U.S. Cl. 23—2      18 Claims

ABSTRACT OF THE DISCLOSURE

Removing carbonyl sulfide from water-immiscible fluids containing the same by intimately contacting the carbonyl sulfide-containing fluid with a highly concentrated aqueous solution of an alkali metal phosphate, said solution having a maximum hydrogen ion concentration corresponding to a pH of 9, thereby hydrolyzing carbonyl sulfide to form a carbonyl sulfide-free fluid.

---

Figure 1:
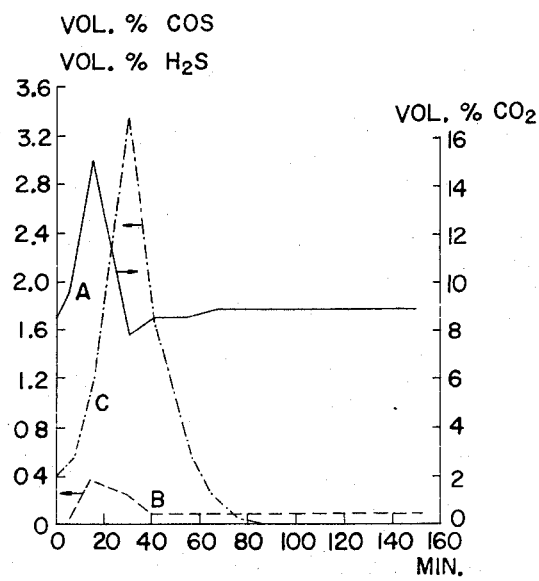
Figure 2:
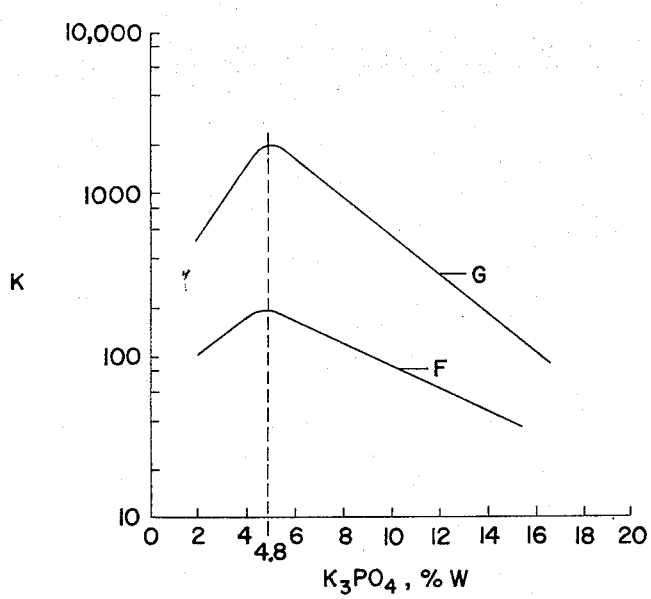

This invention relates to a process for the preparation of fluids at least partly immiscible with water that are entirely or substantially free from carbonyl sulfide.

The term "fluids" herein means gases, liquids and mixtures of gases and liquids.

Liquid hydrocarbon oils, refinery gases and other industrial gases, frequently contain a considerable quantity of sulfur compounds in the form of hydrogen sulfide and carbonyl sulfide. The presence of these sulfur compounds not only renders the gases and liquids malodorous and corrosive, but also has an adverse influence in further processing.

Sulfur-containing refinery gases and low-boiling, liquid, hydrocarbon oil fractions, such as cracking gases and liquid natural gases, as well as industrial gases obtained through partial combustion of carbon-containing materials, such as coke, coal and petroleum fractions, are available in enormous quantities. An economically justified removal of the undesirable sulfur compounds, therefore, is of great importance.

Various processes are known for the removal of hydrogen sulfide from gases and liquids, such as the treatment with an alkali metal hydroxide solution or with aqueous solutions of amines giving alkaline reactions.

The above-mentioned alkaline solutions do not generally perform satisfactorily in the removal of carbonyl sulfide. In certain cases where the gases and liquids contain a low concentration of carbonyl sulfide, completely or substantially complete removal of this compound is a necessity. This is because in the presence of water or water vapor it is slowly hydrolyzed into carbon dioxide and hydrogen sulfide as a result of which the gases and liquids no longer meet the relevant specifications. Moreover, traces of oxygen may oxidize the hydrogen sulfide thus formed to free sulfur, which is equally undesirable.

It has now been found that it is possible to obtain, by hydrolysis, complete or substantially complete removal of carbonyl sulfide from fluids referred to above, which are immiscible or only slightly miscible with water, by contacting these fluids with a highly concentrated aqueous salt solution containing at least one alkali metal phosphate. This solution possesses a low hydrogen ion concentration corresponding to a measured pH of at least 9.

The invention therefore relates to a process for the obtaining of fluids at least partly immiscible with water that are entirely or substantially free from carbonyl sulfide. It is characterized in that the carbonyl sulfide containing fluids are intimately contacted with a highly concentrated aqueous salt solution containing at least one alkali metal phosphate, which solution possesses a hydrogen ion concentration corresponding to a measured pH of at least 9, and by subsequently separating the carbonyl sulfide free fluids from the aqueous salt solution.

A prominent feature of the concentrated phosphate solutions is in their low hydrogen ion concentration, which renders rapid hydrolysis possible. Surprisingly, this low hydrogen ion concentration is maintained in spite of the fact that, during hydrolysis, carbon dioxide and hydrogen sulfide are formed as acidic gases. Remarkably enough, the present solutions prove to be both physically and chemically inert, or substantially inert, with respect to these weakly acidic gases. This means that if gases and liquids contain hydrogen sulfide and/or carbon dioxide, in addition to carbonyl sulfide, it is not necessary to remove these gases beforehand. The inert behavior of the phosphate-containing solutions towards hydrogen sulfide and carbon dioxide is presumably due to the low solubility of these gases in these highly concentrated solutions.

In order to confirm this assumption, the solubility of gas in these alkali metal phosphate solutions was investigated. To obtain as clear an idea as possible of the physical solubility of gases in the solutions, nitrous oxide ($N_2O$) was chosen as a gas, because in contrast with carbon dioxide and hydrogen sulfide, it does not possess any chemical activity with respect to phosphate solutions. An additional reason for this choice was that according to literature data [J. K. A. Clarke, Ind. Eng. Chem., Fundamentals, vol. 3, No. 3 (1964), 239] the solubility behavior of nitrous oxide in salt solutions generally is almost identical with that of carbon dioxide.

The solubility of nitrous oxide was determined in an 11% w. and a 45% w. $K_3PO_4$ solution. The experiments were carried out at temperatures of 30° C., 57° C. and 79° C., respectively, the partial pressure of the nitrous oxide being varied from 3 to 18 atmospheres.

It appears from the results obtained, which are listed in Table I, that the solubility of nitrous oxide drops considerably with increasing temperature and that, at equal conditions of temperature and pressure, it also drops with increasing $K_3PO_4$-concentration. This corresponds to what was found with respect to the hydrolysis of carbonyl sulfide, namely, that at increasing $K_3PO_4$ concentration of the solution the rate of hydrolysis is raised (through the pH being increased) and at the same time the solubility of carbon dioxide is reduced. In addition, it follows from the measurements that at given temperature and $K_3PO_4$ concentrations the solubility of nitrous oxide, to a first approximation, changes in proportion to its partial pressure. The same also applies for carbon dioxide and hydrogen sulfide.

TABLE I

SOLUBILITY OF $N_2O$ IN $K_3PO_4$ SOLUTIONS,* $\beta$=Nml $N_2O$/g SOLVENT/ATM $N_2O$ PRESSURE

| Temperature | 30° C. | | 57° C. | | 79° C. | |
| --- | --- | --- | --- | --- | --- | --- |
| | $N_2O$ partial pressure, (atm.) | $\beta$ | $N_2O$ partial pressure, (atm.) | $\beta$ | $N_2O$ partial pressure, (atm.) | $\beta$ |
| 11% w. $K_3PO_4$ solution | 3.1 | 0.26 | 3.8 | 0.15 | | |
| | 7.7 | 0.25 | 8.6 | 0.14 | 8.1 | 0.10 |
| | 16.3 | 0.24 | 19.4 | 0.13 | 17.3 | 0.10 |
| 45% w. $K_3PO_4$ solution | 2.7 | 0.013 | 4.0 | 0.009 | 5.5 | 0.002 |
| | 10.0 | 0.012 | 9.7 | 0.009 | 10.3 | 0.002 |
| | 18.4 | 0.014 | 18.6 | 0.009 | 19.2 | 0.003 |

*The solubility of $N_2O$ in water, at 30° C. amounts to about 0.55 Nml/g water/atm $N_2O$ pressure (Landolt-Bornstein: 11. Band, 2. Teil, Bandteil b). (Nml means milliliters of gas at 0° C. and 1 atmosphere pressure).

The highly concentrated aqueous salt solutions which are preferred according to the invention are salt solutions containing alkali phosphate which are substantially saturated. Therefore, according to this embodiment of the invention, saturated solutions may be employed.

According to a preferred embodiment of the invention alkali metal phosphate-containing solutions having a hydrogen ion concentration corresponding to a measured pH of at least 9.5 and particularly of at least 10 are used.

The alkali metal phosphates preferably used are potassium phosphates due to their ready solubility in water. More particularly tripotassium orthophosphate and acid dipotassium orthophosphate are used, due to their ability to produce highly concentrated solutions with high pH. The content of potassium phosphates in the concentrated solutions is preferably more than 30 percent by weight and in particular more than 40 percent by weight.

It has been found possible to replace, to a considerable extent, the alkali metal phosphate with at least one other alkali metal salt without departing from the scope of this invention. Preferably inorganic or organic alkali metal salts with high water solubility, such as sodium carbonate, potassium carbonate and lithium acetate are used. Alkali metal salts which do not contribute towards the alkalinity of the solution, such as alkali halides, e.g., potassium chloride and sodium chloride, are also included. The last-mentioned alkali metal salts probably have no direct function with respect to the hydrolysis reaction; their beneficial effect is probably attributed to the fact that they are capable of reducing the solubility of the hydrolysis products formed in the alkali metal phosphate solution.

The rate at which carbonyl sulfide is hydrolyzed by the phosphate solution is rather strongly temperature-dependent.

Accordingly as the temperature is raised, correspondingly higher conversions are attained. On the ground of practical considerations the process will be effected at a temperature of from 20 to 200° C. and preferably of from 60 to 120° C. In practice these conditions may be influenced by the temperature at which the fluids are supplied from a given plant. As the rate at which the hydrolysis proceeds is very much temperature-dependent, it will be advantageous to heat fluids which are supplied at room temperature or lower temperatures to, say, 60 to 80° C.

As higher temperatures are applied the process is preferably carried out at higher pressures in order to avoid undesirable evaporation of water from the phosphate solution. Preferably pressures of at least 1 atmosphere and in particular of from 10 to 30 atmosphere absolute are applied. Suitable pressures may also be higher than 30 atmospheres, for instance 60 atmospheres or 100 atmospheres.

Higher pressures are also of advantage in the treatment of gases because the hydrolysis of carbonyl sulfide is promoted by an increased partial pressure in the gas.

In actual practice the application of higher pressures may, in many cases, not require a higher cost of compression because the gases to be purified are often available at a superatmospheric pressure, such as the gases from plants for the incomplete combustion of carbon-containing material. An additional advantage of working at a superatmospheric pressure is that a smaller gas volume per unit of gas is obtained and therefore a contacting apparatus of considerably smaller dimensions may be utilized.

In certain instances pressure will also be applied in the treatment of liquids, namely when ethane, propane or butane fractions originating from a cracking unit are involved. These fractions are generally present in the refinery as a liquid and they are usually processed further in this physical state. In the treatment of liquid propane, for example, the pressure amounts, as a rule, to at least 25 atmospheres, and in the treatment of butane to at least 10 atmospheres.

For the hydrolysis to proceed satisfactorily the water content of the fluids to be treated should preferably be sufficient that enough water is present in the reaction medium to bring about the hydrolysis. This water may be present in the liquid or in the vapor form. Insofar as the fluids extract water from the phosphate solution at the conditions applied, correspondingly more water should be supplied. This can be done very suitably by adding to the liquid starting material the required quantity of water in a finely dispersed form. The water content of gaseous material can be adjusted to the desired level by saturating it with water at a temperature lower than the treating temperature, for example, by passing the gas through water. A surplus of water should be prevented in order to avoid undesirable dilution of the phosphate solution. If the fluid is too moist it should be dried beforehand to a water content desirable for hydrolysis. This may be accomplished by passing the fluid over a known drying agent, such as alumina or other adsorbents.

The hydrolysis of the carbonyl sulfide present in the gas need only be continued until its content in the gas is not noxious, or becomes so low that it may be completely or substantially removed in an after-treatment of the gas, if any should be applied.

After hydrolysis of the carbonyl sulfide the fluid will preferably be subjected to an after treatment to remove hydrogen sulfide and/or carbon dioxide. These acid gases may have already been present in the starting material and/or may have been formed through the hydrolysis. Conventional extraction or absorption processes may be employed for the removal. Aqueous caustic alkali may be utilized as an absorbent. Preferably, however, alkanolamines or aqueous solutions of these are used. As examples may be mentioned alkanolamines containing from 1 to 4 and preferably from 2 to 3 carbon atoms per alkanol radical, including monoethanolamine, diethanolamine, and/or diisopropanolamine.

Preferably, solutions of alkanolamines which contain a tetramethylene sulfone, are used. The latter solutions may also contain water.

The content of amine, or amines, in the solutions amounts in general to form 7.5 to 70% w. and as a rule to from 30 to 60% w.

The treatment of the gases with the absorbent solutions is preferably carried out in countercurrent, in a vertically arranged absorption column. The treated gas is withdrawn at, or near, the top of the column, and the absorption liquid containing acidic gases is discharged at, or near, the bottom of the column. The column is preferably provided with fractionating trays, baffles and the like to promote the gas-liquid contact.

The acidic constituents from the fluids and the alkanolamines react to form alkanolamine salts that decompose upon being heated, which thus affords a means of regeneration.

The rate at which the carbonyl sulfide in the gases and liquids is hydrolyzed is determined to a large extent by the size of the area of contact between the fluid and the phosphate solution, and also by the intensity of contact. According to one embodiment of the invention, the intimate contact takes place by thorough mixing in a mixing apparatus.

Accordingly the more thorough the mixing the shorter will be the time of contact required for the hydrolysis. With normally available technical mixing apparatus the requisite residence time is, as a rule, at least 15 seconds. Shorter contact times would require such a high mixing energy that the process would be rendered economically unattractive on account of the costly equipment that would be required.

If gases are treated the residence time will preferably amount to at least 10 seconds; for liquids the residence time will preferably be at least 5 minutes. The residence time is influenced by the carbonyl sulfide content of the phase to be treated. If a higher conversion of carbonyl sulfide is desired the residence time may have to be longer, or mixing may have to be more thorough.

If stirred apparatus are used, favorable results are generally obtained if mixing is effected in such a manner that a mechanical power of the stirring elements of at least 1 kw. per m.$^3$ of capacity of the mixing apparatus is transferred to the mixture of the two phases. Mixing apparatus in which the process may be operated with good results include propeller and centrifugal mixers. Other apparatus, by which the gas may be finely dispersed in the treating liquid, may also be used. Good results may be obtained with columns provided with means of promoting the gas-liquid contact such as atomizers, bubble trays, or packing material, such as Raschig rings.

In treating liquids it is generally an advantage to apply a relatively high ratio by volume of phosphate-containing solution to the liquids to be treated. Preferably the ratio is such that the phosphate solution is present as the continuous phase. After phase separation the liquid treated contains little if any disperse phosphate solution. To realize this, the ratio by volume of the phosphate solution to the liquid to be treated is preferably kept, during mixing, at a value of at least 1.

The present process is preferably carried out in at least two steps in apparatus in which staging takes place, for instance, in at least two contacting apparatus arranged in series. To this end, the gases, after having been treated in a first contacting apparatus are passed into a second and, if necessary, into one or more subsequent contacting apparatus. Mixers and settling vessels have to be applied for treating liquids. For example, the carbonyl sulfide-containing phase is mixed in the first stage with the phosphate solution, the two phases are separated in a settling chamber, and the phases to be treated further are subsequently again mixed with phosphate solution, etc.

According to the invention the content of carbonyl sulfide in the fluids may easily be reduced to less than 10% and if desired to less than 1% of the original content.

With good mixing conditions and at elevated temperatures the solutions referred to enable at least 80% of the quantity of carbonyl sulfide present to be hydrolyzed in a single stage. In a successive stage an additional 80% of the remaining 20% may be hydrolyzed, the amount left thus being 4% calculated on the original quantity of carbonyl sulfide; in a third stage the content may then be reduced to less than 1%.

The process of the invention may be applied to all carbonyl sulfide-containing fluids which are at least partly immiscible with the alkali metal phosphate solution applied. As examples already mentioned are: refinery gases and other industrial gases, and low-boiling liquid hydrocarbon oil fractions, such as liquid natural gases. Particularly important industrial gases are the gases obtained through partial combustion of carbon-containing materials, such as coke, coal, crude petroleum, natural gas and petroleum fractions. The partial combustion is usually effected with air and/or oxygen, to which steam and/or carbon dioxide has been added if desired.

The crude combustion gases contain relatively large quantities of hydrogen and carbon monoxide. Depending on the reaction conditions and the nature and quantity of the reactants added to the combustion zone the gases contain larger or smaller quantities of nitrogen, oxygen, water and carbon dioxide. Since the carbon-containing starting materials generally contain sulfur compounds, the gases obtained through partial combustion also contain hydrogen sulfide and carbonyl sulfide. The quantity of carbonyl sulfide in the crude combustion gases is in general relatively large. i.e., from 2 to 10% of the total quantity of sulfur present in the gas. The gases also contain a certain amount of soot, which is, as a rule, completely or partly removed by washing with water prior to further treatment. It is not necessary to cool the gases down to room temperature to apply the present process. The gases which become available at a pressure of from 10 to 50 atmospheres absolute or higher may be treated with the phosphate solution at temperatures up to 200° C. without any additional measures being required.

According to a separate embodiment of the invention the highly concentrated aqueous alkali metal phosphate solution may be impregnated onto a carrier material. According to this embodiment of the invention, the carbonyl sulfide-containing fluids are intimately contacted with a carrier material containing the phosphate solution. When carried out in this manner, the mixing energy required for the thorough mixing in the mixing apparatus is not required.

It is surprising that the alkali metal phosphate-containing carrier materials applied should allow a rapid and complete hydrolysis to be achieved. This is contrary to what one would expect on the basis of the incomplete hydrolysis occurring in known processes such as, for example, when alkali metal hydroxide solutions are applied for the removal of carbon dioxide and hydrogen sulfide from gases also containing carbonyl sulfide. The reason for the unsatisfactory conversion of carbonyl sulfide with the alkali metal hydroxide solutions, etc., is that the high initial alkalinity of the solutions rapidly decreases through the neutralizing action of the carbon dioxide and hydrogen sulfide. As a result of neutralization the hydrolysis reaction proceeds only very slowly or is completely terminated.

Furthermore, it has been surprisingly found that carbonyl sulfide is preferentially sorbed to the phosphate-containing carrier surface, as a result of which hydrolysis is also promoted. This preferential sorption is clearly shown in following Example III, which describes experiments carried out with hydrogen containing hydrogen sulfide and carbon dioxide in addition to carbonyl sulfide. When the starting materials are refinery gases in which the carbonyl sulfide concentration is low, the carbonyl sulfide concentration on the carrier surface will, as a result of this sorption phenomenon, increase to a relatively high value. Due to the simultaneous presence of the alkali metal phosphate a very rapid hydrolysis is effected.

The carrier materials used should preferably be chemically inert towards the alkali metal phosphate-containing solutions applied.

Since the hydrolysis proceeds at the surface of the phosphate-containing carrier material and the rate at which the carbonyl sulfide is converted is also determined by the size of the contact surface area, the use of carrier materials with a relatively large specific surface area is preferred. More specifically, suitable carrier materials are those with a surface area of at least 50 m.$^2$/g. and preferably more than 500 m.$^2$/g. They should preferably have a polar surface. This is advantageous in the preparation of the phosphate-containing carrier material, because a polar surface is more readily and more uniformly wetted by an aqueous solution. Furthermore, the polar surface promotes preferential sorption of carbonyl sulfide.

Examples of suitable carrier materials with a polar surface are: alumina, silica, silica-alumina and/or alkali metal aluminum silicates, either natural or synthetic products. Furthermore, activated carbon may be utilized. Preferred natural carrier materials are bauxite, fuller's earth, diatomaceous earth, natural and activated clays, and/or mixtures thereof. It is preferred to take macroporous carrier material as the starting material, since, in impregnation with the phosphate-containing solutions, there is a chance of narrow pores becoming blocked, which would lead to a loss of available contact surface area.

As regards the loading of the carrier material, this depends on the specific surface area thereof; in general it amounts to from 0.01 to 5 mmoles and preferably to from 0.1 to 1 millimoles of alkali metal phosphate per 1000 m.$^2$ of carrier surface area.

The preparation of the phosphate-containing carrier materials can be carried out in several ways. It may take place, for example, by impregnation of the carrier material with a concentrated aqueous solution of one or more alkali metal phosphates. As a rule the quantity of solution used in this procedure will be such that the impregnated carrier material retains a dry appearance. As concentrated phosphate solutions are rather viscous, the impregnation is preferably carried out with dilute phosphate solutions. The latter solutions may or may not contain other alkali metal salts. The lower viscosity of these solutions considerably accelerates the impregnation. When a dilute solution is used, the impregnation should be followed by drying in order to obtain the high concentration desired, viz a phosphate content of 30 percent by weight and preferably more than 40 percent by weight. This drying procedure may be carried out, for example, by passing a warm, dry, inert gas over the impregnated material. Determination of the available carrier surface area enables a calculation prior to impregnation of the amount of phosphate solution required to obtain complete wetting of the carrier material.

The water content of the gases and liquids to be treated should not be higher than the saturation concentration under the temperature and pressure conditions under which the fluids are brought into contact with the phosphate-containing carrier material. Preferable water contents are, as a rule, those amounting to 30–80% of the saturation concentration. Water contents above the saturation concentration should be avoided, since they might give rise to the formation of a dilute liquid phase in the phosphate-containing material, as a result of which the high pH of the phosphate solution would not be maintained. There would also be a chance of part of the phosphate solution draining from the carrier material.

The process of the invention may be carried out on a batch basis but is preferably carried out continuously. In the latter case the alkali metal phosphate-containing carrier materials can be applied in fluidized or disperse form. Preference is given to a fixed bed, since it enables a staging effect to be reached. This is advantageous as the present hydrolysis is a pseudo first-order reaction.

A fixed bed will permit the use of relatively coarse phosphate-containing carrier material. Suitable are grains or pellets with an average particle size of from 0.1 to 10 mm. (100 mesh ASTM—⅜ in.) and preferably of from 0.3 to 3 mm. (300–3000 mesh ASTM). At a relatively low pressure drop across the bed, fixed beds containing material of this particle size afford the possibility of using high space velocities. The particle size chosen in a given case is also influenced by the diameter of the bed applied, that is, fairly large diameters will in general allow of somewhat coarser particles.

When fixed beds are employed, the space velocities for liquids generally amount to from 10 to 200 m.$^3$ liquid per m.$^3$ impregnated carrier material per hour, and preferably to from 50 to 100 m.$^3$ per m.$^3$ carrier material per hour; for gases these values are in general of from 100 to 12,000 Nm.$^3$ (normal cubic meters, i.e., measured at 0° C. and 1 atmosphere) gas per m.$^3$ carrier material per hour and preferably of from 400 to 4000 Nm.$^3$ gas per m.$^3$ carrier material per hour.

If the impregnated material becomes less active in the course of time, regeneration can take place in a simple manner by elution with warm water, followed by an impregnation with alkali metal phosphate solution. Due to this mild method of regeneration the total life is relatively long.

The invention will be further described by the following Examples I–VII. Examples I and II illustrate the process in which the intimate contact takes place by thorough mixing in a mixing apparatus, and Examples III–VII show the use of the carrier material containing the phosphate solution.

EXAMPLE I

The hydrogen ion concentration expressed as the pH measured was determined of a few concentrated potassium phosphate solutions that may be used according to the invention.

The compositions of the solutions and the pH values are listed in Table II. The pH values were determined after the solutions had been saturated at 20° C. with carbon dioxide gas of 1 atmosphere absolute; this corresponds to an industrial gas which would contain 5% carbon dioxide gas at 20 atmospheres absolute.

From the high pH values it appears that carbon dioxide gas has no neutralizing effect on the concentrated phosphate solutions. Also when hydrogen sulfide or a mixture of carbon dioxide and hydrogen sulfide was passed through it is found that the pH values of the solutions are not lowered. Surprisingly, solution III with a lower total-salt content still has a considerably higher pH than solution II.

TABLE II

| | Composition of phosphate solutions | pH of the solutions after saturation with carbon dioxide gas at 1 atm. abs. and 20° C. |
|---|---|---|
| I | $K_2HPO_4$, 45% w $H_2O$, 55% w | 9.0 |
| II | $K_3PO_4$, 45% w $H_2O$, 55% w | 9.4 |
| III | $K_3PO_4$, 20% w $Na_2CO_3$, 20% w $H_2O$, 60% w | 10.4 |

EXAMPLE II

A number of continuous experiments were carried out with solutions of different compositions containing tripotassium orthophosphate. The rate at which carbonyl sulfide hydrolyzes was investigated at different conditions of temperature, mixing and throughput.

The experiments were carried out at atmospheric pressure with a gas containing 0.6% v. COS, 9% v. $CO_2$, 0.01% v. $H_2S$ and the rest hydrogen. A laboratory mixer of the turbo type was used as mixing apparatus. In one series of experiments an ultraturrax mixer, which is a high shear mixer especially useful for viscous liquids, was employed.

The compositions of the solutions and the conditions under which the experiments were carried out have been listed, together with the results obtained, in Table III. The value $k$, the reaction rate constant, is defined as follows:

gas fed in. From this it clearly follows that the carbonyl sulfide is preferentially sorbed by the phosphate-containing activated carbon.

Subsequently, the temperature was raised to 70° C. over a period of minutes and maintained at that temperature for the remainder of the experiment. The results of the analysis of the gas obtained from the reactor, representing the period from the temperature increase, are represented by FIGURE I. Curves A, B and C represent the contents

TABLE III

| Experiments | Composition of solutions | Mixer | Stirring speed, r.p.m. | Throughput, 1.1-1.h-1* | Temperature, °C | pH | COS conversion, percent | $k$ for a single mixer |
|---|---|---|---|---|---|---|---|---|
| A | 40% K₃PO₄ | Standard laboratory mixer | 0 | 24 | 54 / 75 | 9.5 | 11 / 18 | 3.0 / 5.3 |
| B | 40% K₃PO₄ | do | 550 | 24 | 54 / 74 | 9.5 | 18 / 32 | 5.3 / 11.3 |
| C | 40% K₃PO₄ | do | 1,100 | 24 | 54 / 75 / 33 | 9.5 | 24 / 36 / 38 | 7.6 / 13.5 / 14.7 |
| D | 40% K₃PO₄ | do | 3,000 | 24 | 54 / 73 / 100 | 9.5 | 53 / 66 / 40 | 27 / 46.5 / 16 |
| E | 40% K₃PO₄ | do | 3,000 | 11.2 / 24 / 50 | 54 | 9.9 | 74 / 53 / 33 | 32 / 27 / 25 |
| F | 30% K₃PO₄ / 5% Na₂CO₃ / 5% Na₂S | do | 5,900 | 33 / 42 / 52 / 100 | 40 | 9.3-9.8 | 42 / 34 / 31 / 23 | 24 / 21.6 / 23 / 30 |
| G | 45% K₃P₄ | Ultra-Turrax | 10,000 | 13.3 / 33 / 67 / 100 | 45 | 10.7 | 95 / 90 / 75 / 50 | 253 / 298 / 201 / 100 |
| H | | Standard laboratory mixer | 1,000 | 33 | ca. 40 | 10.7 | 40 | 22 |

*Liters of gas per liter of solution per hour.

The results lead to the following conclusions:

(1) The rate at which carbonyl sulfide hydrolyzes is clearly promoted (a) by a higher pH of the solution, (b) by enlarging the area of contact or intensifying the contact, between liquid and gas (i.e., through increasing the mixing energy), and (c) by raising the temperature.

(2) An increase in temperature to above about 80° C. should preferably be accompanied by an increase in working pressure in order to avoid evaporation.

(3) The temperature has little if any influence on the pH of the phosphate solution.

EXAMPLE III

This experiment was carried out in a vertically arranged reactor containing a fixed bed of phosphate-containing activated carbon.

The phosphate-containing carbon was prepared by impregnating activated carbon with a specific surface area of 1230 m.²/g. and in the form of pellets of 1 x 3 mm. with a 10% aqueous tripotassium phosphate solution, followed by concentration of the solution incorporated in the carbon with the aid of warm dry air. From the volume of phosphate solution applied and by weighing the impregnated carbon it was established that the carbon contained 6% w. tripotassium phosphate in a 45% aqueous solution.

A gas containing 0.37% v. carbonyl sulfide, 8.5% v. carbon dioxide, 0.02% v. hydrogen sulfide, the balance being hydrogen, was passed over this bed of phosphate-containing activated carbon at the rate of 114 m.³/m.³/h. at atmospheric pressure and at a temperature of 20° C.

The content of carbonyl sulfide, carbon dioxide and hydrogen sulfide present in the exit gas of the reactor was determined from the beginning of the experiment by gas chromatography. After a short running-in period both the carbon dioxide and the hydrogen sulfide content of the exit gas was equal to that of the gas fed in. However, it took a considerable amount of time before the carbonyl sulfide content of the exit gas was equal to that of the of carbon dioxide (right-hand axis, figures expressed in percent vol.), hydrogen sulfide and carbonyl sulfide (left-hand axis, figures expressed in percent vol.), respectively, in the exit gas of the reactor. The shape of the curves shows that as a result of the temperature increase from 20 to 70° C., part of the sorbed gas components is desorbed. The content of the three components increased temporarily beyond that of the gas fed in. The carbonyl sulfide content of the exit gas went through a maximum after 30 minutes, decreased subsequently and reached the same value as the gas fed in, after 60 minutes.

After this point of time the carbonyl sulfide content of the exit gas continued to decrease and reached a value of 0 in a period of 30 minutes. This shows that after a steady sorption state has been reached in the phosphate-containing bed the carbonyl sulfide is rapidly and completely hydrolyzed at a temperature of 70° C. This is confirmed by the increase in carbon dioxide and hydrogen sulfide content of the exit gas as a result of the hydrolysis products formed.

EXAMPLE IV

In the same reactor as described in Example III, continuous runs were made with a bed of 1 m.³ phosphate-containing activated carbon in the form of pellets of 1 x 3 mm. The carbon was prepared in the same way as described in Example III; the tripotassium phosphate content of the carbon was 9.3% w. These runs were made to establish the rate at which carbonyl sulfide hydrolyzes in the phosphate-containing bed, with variations in temperature and space velocity conditions.

The runs were carried out at a pressure of 21 atmospheres absolute with a gas containing 0.37% v. carbonyl sulfide, 8.5% v. carbon dioxide, 0.02% v. hydrogen sulfide, the balance being hydrogen. The conditions and results obtained are represented in Table IV.

In these runs the rate of hydrolysis has been denoted as a reaction constant whose value is expressed by the formula $K = RD[-2.303 \log(1-f)]$, where RD is the space velocity and $f$ the fraction of carbonyl sulfide hydroylzed.

phate-containing coke (1m.$^3$), consisting of particles of 1 x 3 mm., which contained 1.9% w. $K_3PO_4$ as a 45% w.

TABLE IV

| Run | Reactor contents | Space velocity, m.$^3$/m.$^3$/h. at working pressure, (RD) | Working pressure, atm. abs. | Temperature in reactor, °C. | COS conv., percent | Reaction rate constant K= RD [−2.303 log (1−f)]* |
|---|---|---|---|---|---|---|
| 1 | 1 m.$_3$ activated carbon with a $K_3PO_4$ content of 9.3 percent w. | 83 | 21 | 50 | 48 | 54 |
| 2 | | 86 | 21 | 70 | 77 | 126 |
| 3 | | 120 | 21 | 80 | 95 | 361 |
| 4 | | 202 | 21 | 80 | 80.5 | 330 |
| 5 | | 450 | 21 | 90 | 90.5 | 1,060 |

*f=fraction of COS hydrolyzed

The results give rise to the following conclusions:

(1) The rate at which carbonyl sulfide hydrolyzes is clearly promoted by a temperature increase.

(2) However, in view of the great activity of the catalyst used there are no objections to working at a relatively low reactor temperature, the space velocities possible still being attractively high for actual practice.

(3) The presence of the acid gas components $CO_2$ and $H_2S$ in the starting gas has no adverse influence on the carbonyl sulfide conversion. An increase in $H_2S$ concentration to 8% v. in the mixing gas did not give any change in this respect.

EXAMPLE V

In the same reactor as used in Examples III and IV a series of continuous runs was carried out.

The purposes of these runs were for establishing the influence of the phosphate content of the activated carbon on the hydrolysis results.

The experiments were carried out at a pressure of 21 atmospheres absolute with a gas mixture containing 0.37% v. COS, 8.5% v. $CO_2$, 0.02% v. $H_2S$, balance hydrogen.

The phosphate contents of the active carbon were 1.9, 4.2, 7.5 and 13.7% w. respectively. Also, the effect of temperature was checked by carrying out the experiments at 70 and 90° C.

The conditions and results obtained have been collected in Table V. FIGURE II curve F represents the hydrolysis results obtained at 70° C. and curve G those obtained at 90° C. In FIGURE II the reaction rate constant K has been plotted against the concentration of the $K_3PO_4$ solution, expressed in percent wt.

The conclusion to be drawn from the results obtained is that there is an optimum activity of the impregnated active carbon which depends on the phosphate content. For the activated carbon used this optimum lies at a phosphate content of approximately 4.8% w, both at a temperature of 70° C. and one of 90° C.

The explanation for these optima is that an increase in phosphate content leads on the one hand to an increase in alkalinity of the carrier surface but on the other hand to a decrease in available carrier surface area. The two effects are opposed.

solution. The experiment was carried out at a pressure of 21 atmospheres absolute with a gas containing 0.37% v. COS, 8.5% v. $CO_2$, 0.02% v. $H_2S$, the balance being hydrogen.

The reactor temperature was 110° C., while the space velocity, measured at working pressure, amounted to 48 m.$^3$ gas per m.$^3$ phosphate-containing coke per hour. Under these conditions a COS hydrolysis of only 8.7% and a reaction rate constant of 4 were achieved. From Table V, Run 7, it follows that activated carbon with 1.9% w. $K_3PO_4$ yields a reaction rate constant at 90° C. of 493. The low COS hydrolysis obtained in the present run with impregnated coke is apparently due to the small surface area of the carrier material employed (the surface area before impregnation with the phosphate solution was <5 m.$^2$/g.) in contrast to the relatively large surface area of the active carbon applied in Examples III–V (there the surface area before impregnation was 1230 m.$^2$/g.

EXAMPLE VII

In a subsequent continuous run the carrier material employed was alkaline-reacting alumina (specific surface area 100 m.$^2$/g. particle size 50–100 mesh), which after impregnation with phosphate solution in the manner described in Example III contained 1.9% w. $K_3PO_4$.

The run was carried out at a pressure of 21 atmospheres absolute with a gas mixture containing 0.37% v. COS, 8.5% v. $CO_2$, 0.02% v. $H_2S$, the balance being hydrogen. The reactor temperature was 90° C. and the space velocity, measured at working pressure, amounted to 172 m.$^3$ gas per m.$^3$ phosphate-containing alumina per hour. Under these conditions a COS hydrolysis of 83% and a very high reaction rate constant of 3053 were reached.

From this run it follows that the alkaline-reacting phosphate-containing alumina shows an even higher hydrolyzing activity than the phosphate-containing activated carbon.

Hence, carrier materials with a surface which is by nature alkaline-reacting are particularly suitable carrier materials for $K_3PO_4$.

TABLE V

| Run | $K_2PO_4$ on activated carbon, percent w. | Space velocity (RD), at working pressure, m.$^3$/m.$^3$/h. | Working pressure, atm. abs. | Reactor, temp., °C. | COS hydrolysis, percent | Reaction rate constant K=RD [−2.303 log (1−f)]* |
|---|---|---|---|---|---|---|
| 6 | 1.9 | 109 | 21 | 60 | 70 | 100 |
| 7 | 1.9 | 190 | 21 | 90 | 92.5 | 493 |
| 8 | 4.2 | 74 | 21 | 70 | 92 | 186 |
| 9 | 4.2 | 586 | 21 | 90 | 94 | 1,648 |
| 10 | 7.5 | 86 | 21 | 70 | 77 | 126 |
| 11 | 7.5 | 451 | 21 | 90 | 90.5 | 1,062 |
| 12 | 13.7 | 49 | 21 | 70 | 69.5 | 48 |
| 13 | 13.7 | 134 | 21 | 90 | 75 | 185 |

*f=fraction of COS hydrolyzed.

EXAMPLE VI

In order to establish the role which the nature of the carrier material applied plays in the hydrolysis of the carbonyl sulfide, a continuous run was carried out in which the reactor had been provided with a bed of phos-

I claim as my invention:

1. A process for the removal of carbonyl sulfide by hydrolysis from gases containing the same which comprises intimately contacting said fluids with a highly concentrated aqueous salt solution containing at least one alkali metal phosphate, which solution possesses a low hydrogen ion concentration corresponding to a measured pH of at least 9 and subsequently separating the carbonyl sulfide free gas from the aqueous salt solution.

2. A process according to claim 1 wherein the concentrated salt solution is a substantially saturated alkali metal phosphate solution.

3. A process according to claim 2 wherein the alkali metal phosphate is a potassium phosphate or mixture of potassium phosphates.

4. A process according to claim 3 wherein the potassium metal phosphate is tripotassium orthophosphate or dipotassium orthophosphate or mixtures thereof.

5. A process according to claim 4 wherein the potassium phosphate concentration of the aqueous solution is at least 30% by weight.

6. A process according to claim 4 wherein the salt solution contains, in addition to the potassium phosphate, at least one other water soluble alkali metal salt.

7. A process according to claim 6 wherein the other alkali metal salt is sodium carbonate.

8. A process according to claim 5 wherein the hydrolysis is carried out at a temperature of from 20 to 200° C. and at a pressure of at least 1 atmosphere.

9. A process according to claim 8 wherein the hydrolysis is carried out at a temperature of from 60 to 120° C.

10. A process according to claim 8 wherein the hydrolysis is carried out at a pressure of from 10 to 30 atmospheres absolute.

11. A process according to claim 5 wherein the ratio by volume of concentrated aqueous potassium phosphate to gases is at least 1.

12. A process according to claim 5 wherein the hydrolysis is carried out in two or more stages.

13. A process according to claim 5 wherein the carbonyl sulfide containing gases are intimately contacted with a solid carrier upon which the concentrated potassium phosphate solution has been impregnated.

14. A process according to claim 13 wherein the carrier has a surface area of at least 50 square meters per gram and is inert toward the concentrated potassium phosphate solution.

15. A process according to claim 14 wherein the carrier has a substantially macroporous structure and is selected from the group consisting of alumina, silica, silica/alumina, alkali metal silicates and activated carbon.

16. A process according to claim 15 wherein the carrier contains from 0.01 to 5.0 mmoles of potassium phosphate for each 1000 square meters of carrier surface area.

17. A process according to claim 16 wherein the carrier is alumina.

18. A process according to claim 16 wherein the carrier material is activated carbon.

References Cited

UNITED STATES PATENTS

| | | | |
|---|---|---|---|
| 1,710,141 | 4/1929 | Benner et al. | 23—2 X |
| 2,110,403 | 3/1938 | Rosenstein | 23—3 |
| 2,758,005 | 8/1956 | Oakley | 23—3 |
| 3,058,800 | 10/1962 | Frevel et al. | 23—2 |

OSCAR R. VERTIZ, Primary Examiner

E. C. THOMAS, Assistant Examiner

U.S. Cl. X.R.

208—230